United States Patent
Aston et al.

(10) Patent No.: US 9,296,493 B2
(45) Date of Patent: Mar. 29, 2016

(54) SPACECRAFT WITH OPEN SIDES

(71) Applicant: The Boeing Company, Chicago, IL (US)

(72) Inventors: Richard W. Aston, Brea, CA (US); Anna M. Tomzynska, Seal Beach, CA (US)

(73) Assignee: The Boeing Company, Chicago, IL (US)

(*) Notice: Subject to any disclaimer, the term of this patent is extended or adjusted under 35 U.S.C. 154(b) by 629 days.

(21) Appl. No.: 13/781,483

(22) Filed: Feb. 28, 2013

(65) Prior Publication Data
US 2014/0239124 A1 Aug. 28, 2014

(51) Int. Cl.
| | |
|---|---|
| *B64G 1/10* | (2006.01) |
| *B64G 1/40* | (2006.01) |
| *B64G 1/44* | (2006.01) |
| *B64G 1/54* | (2006.01) |
| *B64G 1/58* | (2006.01) |

(52) U.S. Cl.
CPC ........ *B64G 1/10* (2013.01); *B64G 1/402* (2013.01); *B64G 1/44* (2013.01); *B64G 1/54* (2013.01); *B64G 1/58* (2013.01); *B64G 2001/1092* (2013.01); *Y10T 29/49826* (2015.01)

(58) Field of Classification Search
CPC ........... B64G 1/10; B64G 1/44; B64G 1/283; B64G 1/285; B64G 1/402; B64G 1/503; B64G 1/58; B64G 2001/1092
See application file for complete search history.

(56) References Cited

U.S. PATENT DOCUMENTS

| | | | |
|---|---|---|---|
| 4,009,851 A | 3/1977 | Cable | |
| 5,314,146 A * | 5/1994 | Chicoine et al. | 244/173.1 |
| 5,979,833 A * | 11/1999 | Eller et al. | 244/159.4 |
| 6,206,327 B1 | 3/2001 | Benedetti et al. | |
| 2003/0150958 A1* | 8/2003 | Herbert | 244/158 R |

FOREIGN PATENT DOCUMENTS

| | | |
|---|---|---|
| EP | 0823374 A2 | 2/1998 |
| EP | 0849166 | 6/1998 |
| GB | 1557500 A | 12/1979 |
| RU | 2087387 C1 | 8/1997 |

OTHER PUBLICATIONS

Russian Search Report for Russian counterpart to U.S. Appl. No. 13/781,483, mailed Jul. 8, 2014.
European Search Report, EP14156422, dated May 12, 2015.

* cited by examiner

*Primary Examiner* — Nicholas McFall (57) ABSTRACT

A spacecraft may include a module structure having a plurality of module sides. The spacecraft may include a central cylinder extending through a center of the spacecraft. The central cylinder may be the only closed cross-section extending along a longitudinal axis of the spacecraft.

18 Claims, 9 Drawing Sheets

SPACECRAFT WITH OPEN SIDES

FIELD

The present disclosure relates generally to structural configurations and, more particularly, to support structures for spacecraft.

BACKGROUND

Conventional 3-axis stabilized spacecraft typically have a plurality of flat sides in a closed box-like structural arrangement. The box-like structural arrangement is conducive to supporting generally flat components that are commonly used on spacecraft. Such components may include thermal radiation panels, solar arrays, and antennae.

Unfortunately, the box-like arrangement of conventional spacecraft may include redundant structure. For example, conventional spacecraft may include structure for transmitting spacecraft loads into the base of the satellite at the interface with the launch vehicle. In addition, conventional spacecraft may include outer panels for mounting spacecraft components such as for communications, and wherein the outer panels may also provide redundant load-carrying capability for the spacecraft.

The redundant outer panels may unnecessarily increase the overall mass of the spacecraft which may increase the cost of inserting the spacecraft into orbit. In addition, the increased mass of the spacecraft may result in a decrease in the amount of propellant that can be carried by the spacecraft for orbit insertion and/or station-keeping. Such increased mass may therefore reduce the operational life of the spacecraft.

As can be seen, there exists a need in the art for a structural arrangement for a spacecraft that minimizes or eliminates redundant structure.

SUMMARY

The above-noted needs associated with spacecraft structures are specifically addressed and alleviated by the present disclosure which provides a spacecraft having a module structure with a plurality of module sides. The spacecraft may include a central cylinder extending through a center of the spacecraft. The central cylinder may comprise the only closed cross-section extending along a longitudinal axis of the spacecraft.

In a further embodiment, disclosed is 3-axis-stabilized spacecraft having a module structure with a plurality of module sides. The spacecraft may include a central cylinder extending through a center of the spacecraft. The central cylinder may be the only closed cross-section extending along a longitudinal axis of the spacecraft. A propellant tank may be housed within the central cylinder.

Also disclosed is a method of assembling a spacecraft. The method may include providing a module structure of a spacecraft having a plurality of module sides. The method may further include extending a central cylinder through a center of the spacecraft wherein the central cylinder comprises the only closed cross-section extending along a longitudinal axis of the spacecraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
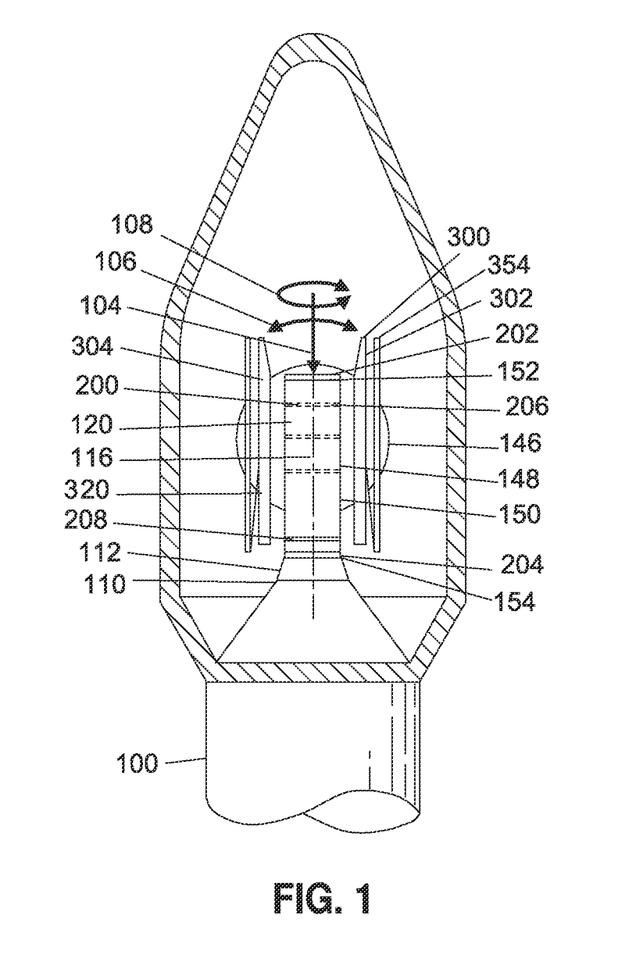
FIG. 1 is a cross-sectional illustration of a spacecraft encapsulated within a launch vehicle.

Referring now to the drawings wherein the showings are for purposes of illustrating preferred and various embodiments of the disclosure, shown in FIG. 1 is a sectional illustration of a spacecraft 146 encapsulated within a launch vehicle 100. The spacecraft 146 may be configured as a communications satellite and may be supported on a core structure 148 having a central cylinder 150. The central cylinder 150 may extend vertically through the spacecraft 146 from a top end of the spacecraft 146 down to a payload attach fitting 112 where the central cylinder 150 may interface with the launch vehicle 100 at a separation plane 110.

Figure 2:
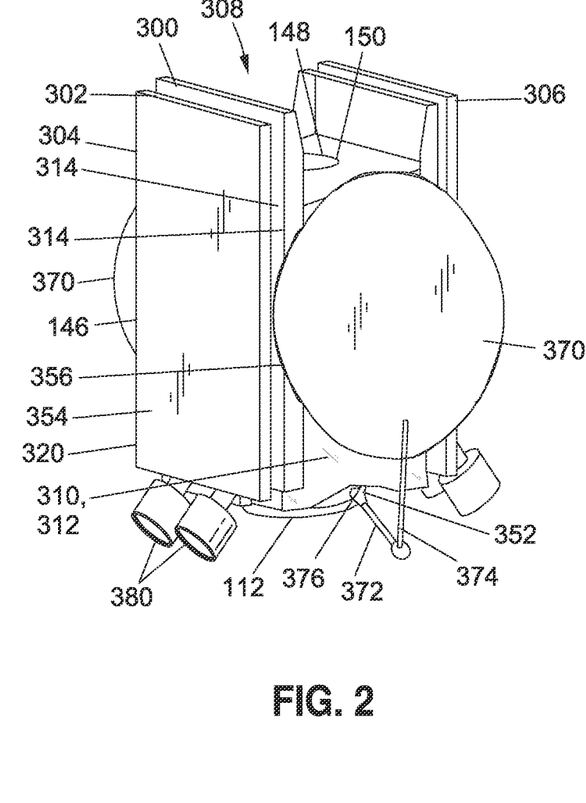
FIG. 2 is a perspective illustration of an embodiment of the spacecraft of FIG. 1.

FIG. 2 is a perspective illustration of the spacecraft 146 which may be configured as a 3-axis stabilized spacecraft or a spin-stabilized spacecraft. The spacecraft 146 may include an electronics module 300 supported on the central cylinder 150. The electronics module 300 may include a load-carrying module structure 302 having a plurality of module sides 304. One or more of the modules sides 304 may include rigid panels 314 for mounting the spacecraft equipment and forming closed sides 306 of the spacecraft 146. In the present disclosure, the electronics module 300 is defined as including operational components such as antennae 370, solar panels 354, thermal radiator panels 320, thrusters 380, and other components that may be coupled to the module structure 302 at outer spacecraft interfaces. The central cylinder 150 may be configured to support the loads acting on the spacecraft 146 including axial loads 104, bending loads 106, and torsional loads 108.

Advantageously, the central cylinder 150 may be the only closed cross-section 120 extending along a longitudinal axis 116 of the spacecraft 146. In this regard, the central cylinder 150 may provide a substantial portion of the axial, bending, and torsional strength and stiffness for the spacecraft 146. Loads from the module structure 302 may be transferred to the central cylinder 150 which may transfer the loads into the launch vehicle 100 such as during launch. After separation of the spacecraft 146 from the launch vehicle 100, loads on the module structure 302 due to firing of thrusters 380 and/or manipulation of the solar panels 354 may be transferred to the central cylinder 150 which may provide bending, torsional, and axial stiffness for the spacecraft 146. By supporting a substantial portion (e.g., an entirety) of the spacecraft loads with the central cylinder 150, the need to provide rigid panels 314 on one or more of the module sides 304 may be eliminated. In this manner, the module structure 302 may include an opposing pair of open sides 308 which may devoid of rigid members or load-carrying members and which may be covered by non-rigid closeouts 310 such as thermal blankets 312 or other flexible and/or removable covering.

By forming the electronics module 300 with open sides 308, the spacecraft 146 may be provided with a significant reduction in part count relative to the part count associated with conventional spacecraft 146. In addition, the use of the central cylinder 150 supporting an electronics module 300 with open sides 308 may provide a significant reduction in structural mass of the spacecraft 146 relative to conventional spacecraft. Furthermore, the open sides 308 of the electronics module 300 may provide a significant improvement in access to the spacecraft 146 interior during payload integration. In this regard, the various components in the interior of the spacecraft 146 may be readily access during all phases of integration which may provide a significant reduction in rework time associated with one or more spacecraft components during testing.

Figure 3:
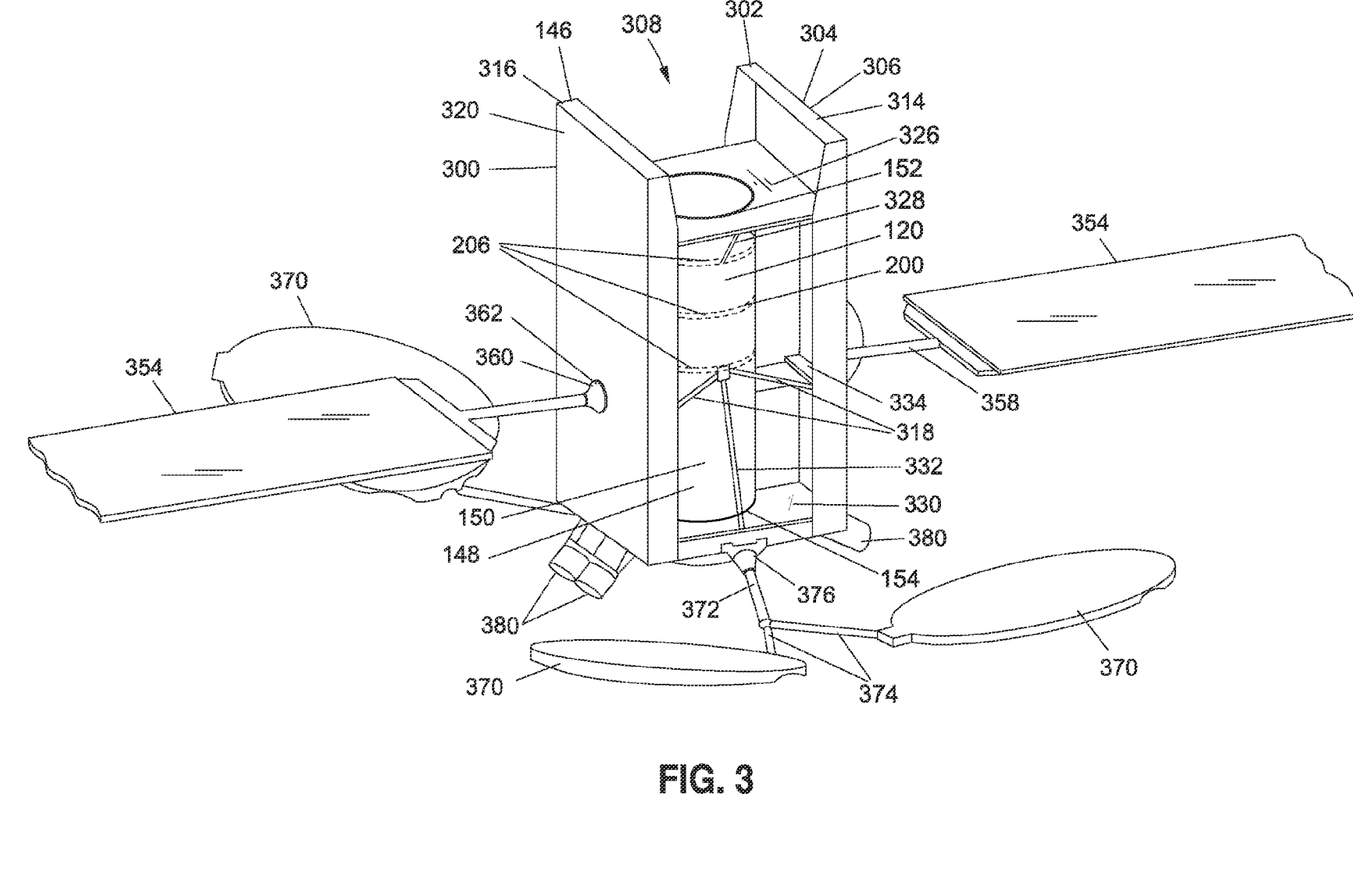
FIG. 3 is a perspective illustration of the spacecraft of FIG. 2 with solar panels and antennae in a deployed position.

FIG. 3 shows an embodiment of the spacecraft 146 with solar panels 354 and antennae 370 in a deployed position. Each one of the solar panels 354 may be mounted on a solar panel mast 358 which may be coupled to the module structure 302. For example, the spacecraft 146 may include a pair of deployable solar panels 354 that may be coupled to the payload equipment panels 316 on opposite sides of the cylinder 150. Each one of the solar panel masts 358 may be coupled to a solar panel fitting 362 at a solar panel mast interface 360 on each one of the payload equipment panels 316.

In FIG. 3, the spacecraft 146 may include one or more antennae 370 that may be coupled to the module sides 304 of the module structure 302. For example, FIG. 3 illustrates the spacecraft 146 having deployable antennae 370 mounted on an antenna boom 374 that may be coupled to the bottom end panel 330 at an antenna mast interface 376 on opposite sides of the bottom end panel 330. Each antenna mast 372 may include one or more antenna booms 374 extending outwardly from antenna mast 372 for supporting one or more antennae 370. The spacecraft 146 may further include a pair of fixed or deployable thermal radiator panels 320. For example, FIG. 3 illustrates generally planar thermal radiator panels 320 fixedly coupled to or integrated with the payload equipment panels 316 located on each side of the cylinder 150. The thermal radiator panels 320 may provide thermal management for the various spacecraft components.

Figure 4:
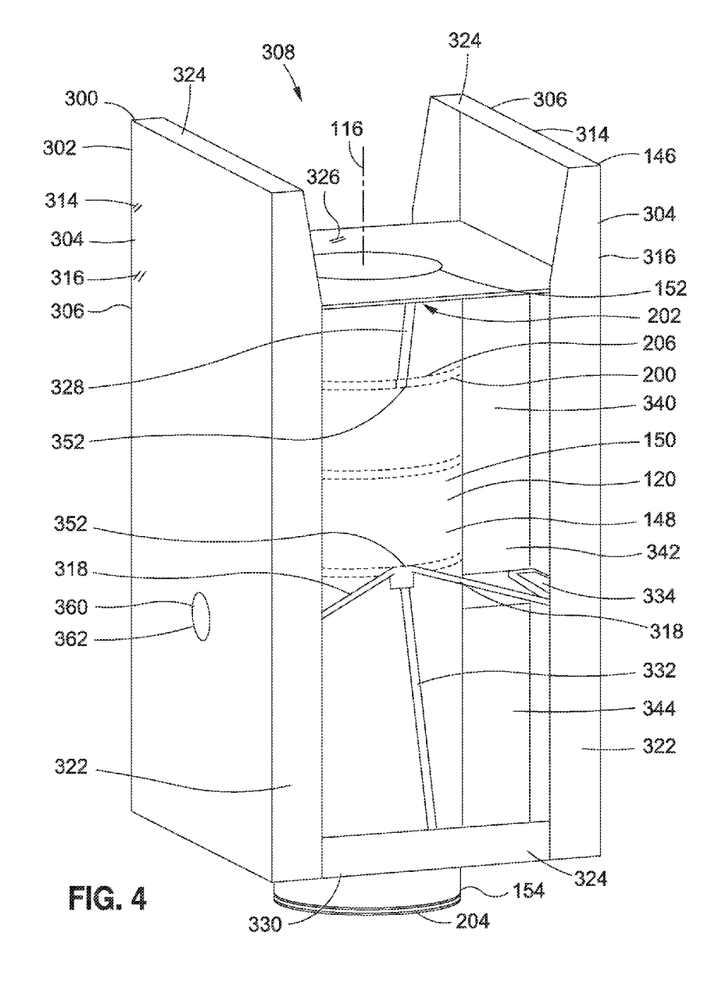
FIG. 4 is a perspective illustration of a module structure of an electronics module coupled to the central cylinder at a plurality of interface locations.

FIG. 4 is a perspective illustration of the module structure 302 of the electronics module 300 coupled to the central cylinder 150. The module structure 302 may include a pair of rigid panels 314 positioned on opposite sides of the central cylinder 150 and forming closed sides 306 of the box-shaped module structure 302. The rigid panels 314 may be oriented generally parallel to one another and may be generally planar in shape although non-planar shapes are contemplated. The rigid panels 314 may be generally aligned with the longitudinal axis 116 and may be configured as payload equipment panels 316. The module structure 302 may further include vertical shear panels 340 and top and bottom end panels 326, 330 for coupling the payload equipment panels 316 to the central cylinder 150 at one or more interface locations 352. FIG. 4 further illustrates the open sides 308 of the module structure 302 which may be devoid of rigid members (e.g., rigid panels 314 or payload equipment panels 316) extending across the open sides 308. Each open side 308 is open in the sense that there are no torsional load paths across the open side 308 between the rigid panels 314. For example, for each open side 308, there are no load-carrying structural diagonal elements extending between the rigid panel 314 (payload equipment panel 316) on one side of the central cylinder 150 and the rigid panel 314 (payload equipment panel 316) on the opposite side of the central cylinder 150. In addition, the open sides 308 are open in the sense that for each open side 308, there are no torsional load-carrying structural elements extending across the open side 308 that may obstruct or restrict access to the interior of the spacecraft 146 from the open side 308.

As shown in FIG. 2, at least one of the open sides 308 may have a non-rigid closeout 310 covering at least a portion of the open side 308. In an embodiment, the non-rigid closeout 310 may comprise a flexible and/or removable covering such as a fabric material that may be removably secured over the open side 308 of the module structure 302. In an embodiment, the non-rigid closeout 310 may be removably secured in place over the open side 308 such as with mechanical fasteners, hook and loop tape (e.g., Velcro™), or other fastening means. In FIG. 2, the non-rigid closeout 310 may comprise a thermal blanket 312 at least partially covering the open side 308 and providing thermal shielding, radiation shielding, and/or electro-magnetic interference (EMI) shielding for the components in the spacecraft interior.

Figure 5:
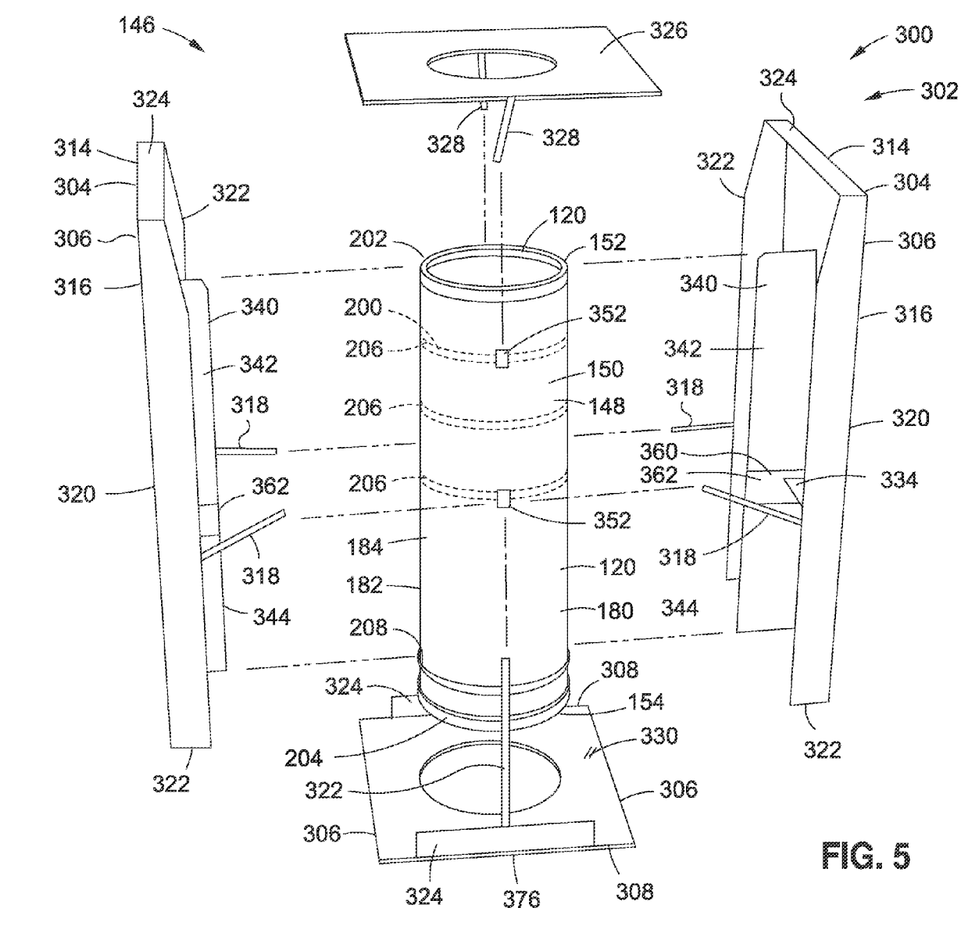
FIG. 5 is an exploded perspective illustration of the module structure and the interconnection thereof to the central cylinder at the plurality of interface locations.

FIG. 5 is an exploded view of the module structure 302 illustrating the interconnectivity of the structural components of the electronics module 300 with the central cylinder 150 at a plurality of interface locations 352. In an embodiment, the module structure 302 may include vertical shear panels 340 and top and bottom end panels 326, 330 for coupling the rigid panels 314 (e.g., the payload equipment panels 316) to the central cylinder 150. The vertical shear panels 340 may extend along the sides of the central cylinder 150 and may be aligned with the longitudinal axis 116 of the central cylinder 150. The vertical shear panels 340 may transfer the axial load of the payload equipment panels 316 to the central cylinder 150 which, in turn, may transfer the axial load of the electronics module 300 into the launch vehicle 100.

In FIG. 5, in an embodiment, the vertical shear panels 340 may extend generally radially outwardly from opposite sides of the central cylinder 150 and may couple the payload equipment panels 316 to the central cylinder 150. The vertical shear panels 340 may be coupled to the central cylinder 150 using brackets (not shown) and mechanical fasteners (not shown) and/or by adhesive bonding. Although FIG. 5 shows a single vertical shear panel 340 coupling each one of the payload equipment panels 316 to a side of the central cylinder 150, the module structure 302 may include any number of vertical shear panels 340 oriented in any direction for coupling each payload equipment panel 316 to the central cylinder 150. Each vertical shear panel 340 may be comprised of a shear panel upper portion 342 and a shear panel lower portion 344 which may be interconnected to one another by the solar panel fitting 362. However, each vertical shear panel 340 may be formed as a unitary structure.

In FIG. 5, the payload equipment panels 316 may include corner beams 322 extending vertically along the side edges for increasing the stiffness and strength of the payload equipment panels 316. In addition, each payload equipment panel 316 may include an end beam 324 along the upper edge and/or lower edge of the payload equipment panel 316. At the bottom end of the spacecraft 146, end beams 324 may extend between the opposing pairs of the payload equipment panel 316. In an embodiment, each payload equipment panel 316 may also include one or more panel inner stiffeners 334 mounted on an inner side of each one of the payload equipment panels 316. In FIG. 5, a pair of panel inner stiffeners 334 may be interconnected by the solar panel fitting 362. However, each one of the panel inner stiffeners 334 may be formed as a unitary structure for increasing the stiffness of the payload equipment panels 316.

In an embodiment, each one of the payload equipment panels 316 may be supported by one or more braces extending from the central cylinder 150. For example, each payload equipment panel 316 may be supported by a pair of payload equipment panel braces 318 extending from an interface location 352 at an internal ring 206 of the central cylinder 150. The payload equipment panel braces 318 may support the payload equipment panels 316 against out-of-plane bending. The payload equipment panels 316 may be configured to mount a plurality of various components or equipment (not shown) such as on an inner side of the payload equipment panels 316. Although not shown, such components or equipment may include telemetry and spacecraft control components, communications components such as receivers, transmitters, and transponders, and other components.

In FIG. 5, the module structure 302 may include a top end panel 326 and a bottom end panel 330 which may be positioned on opposite ends of the module structure 302. For example, the top end panel 326 and the bottom end panel 330 may be mechanically coupled to a forward end ring 202 at the cylinder top end 152. The bottom end panel 330 may be mechanically coupled to an external ring 208 proximate the cylinder bottom end 154 or to an aft end ring 204 (not shown) at the cylinder bottom end 154. The payload equipment panels 316 on each side of the central cylinder 150 may extend between and interconnect the top end panel 326 with the bottom end panel 330. In the embodiment shown, the top end panel 326 and the bottom end panel 330 may be generally planar in shape and may be oriented parallel to one another and normal to the longitudinal axis 116 of the spacecraft 146. However, the top end panel 326 and the bottom end panel 330 may be provided in alternative (e.g., non-planar) shapes and configurations and are not limited to the configuration shown in the figures.

In FIG. 5, in an embodiment, one or more of the rigid panels 314, top end panel 326, bottom end panel 330, and vertical shear panels 340 may be formed of composite material such as fiber-reinforced polymer matrix material 180. For example, the rigid panels 314, the top and bottom end panels 326, 330, and the vertical shear panels 340 may be provided in a light weight and stiff composite sandwich 184 construction. The composite sandwich 184 construction may include a core layer (not shown) sandwiched between fiber-reinforced face sheets (not shown). The core layer may comprise multi-cell material such as foam, honeycomb formed of aluminum, aramid, fiberglass, or the core layer may be formed of other core material. The face sheets may be formed as laminated plies of composite material such as laminated graphite composite face sheets. However, one or more of the structural components of the module structure 302 may also be formed of metallic material or other material or combinations thereof.

In FIG. 5, in the embodiment shown, the module structure 302 may include one or more braces coupling the top end panel 326 and the bottom end panel 330 to the central cylinder 150 for axial support along the edges of the top and bottom end panel 326, 330 on the open sides 308 of the module structure 302. For example, the edges of the top end panel 326 on the open sides 308 of the module structure 302 may be coupled to the central cylinder 150 by means of one or more top panel braces 328 extending from each side of the central cylinder 150 at the location of a internal ring 206 or external ring (not shown) on the central cylinder 150. Likewise, the edges of the bottom end panel 330 may be coupled to the central cylinder 150 by means of one or more antenna braces 332 extending from the edges of the top end panel 326 to each side of the central cylinder 150 at the location of an internal ring 206 or external ring 208 (not shown). The top panel braces 328 and the antenna braces 332 may provide support to the top end panel 326 and bottom end panel 330 against axial loads 104.

Figure 6:
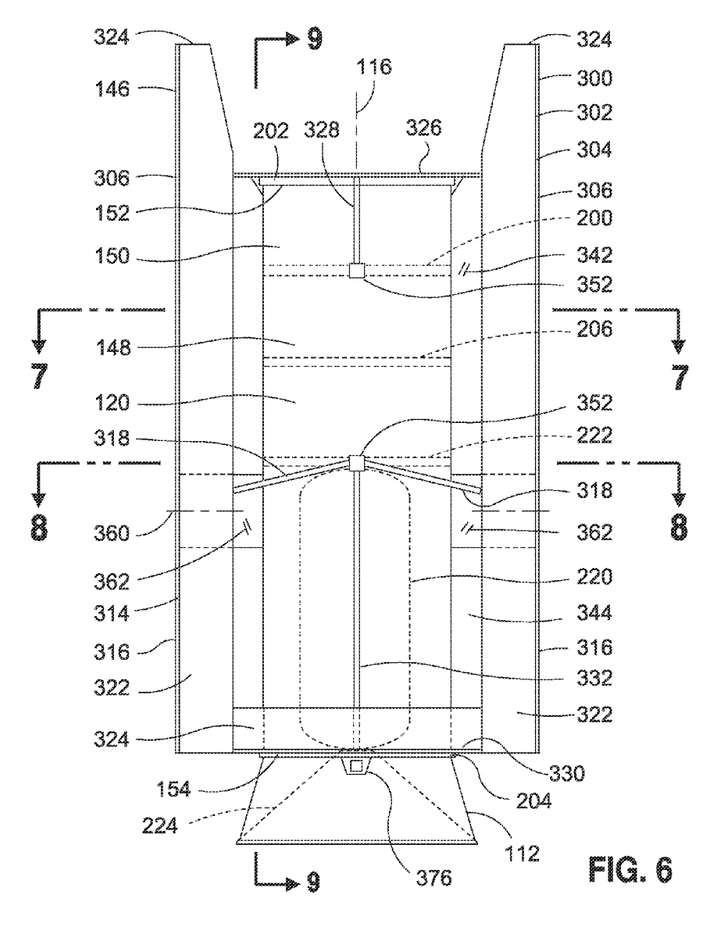
FIG. 6 is a side view of the module structure and illustrating a plurality of braces coupling the module structure to the interface locations on the central cylinder.

FIG. 6 is a side view of the spacecraft 146 in an embodiment wherein the cylinder bottom end 154 terminates at the bottom end panel 330 and a conical payload attach fitting 112 extends downwardly from the cylinder bottom end 154. The payload attach fitting 112 may be sized and configured to releasably couple with the launch vehicle 100 (FIG. 1). FIG. 6 also illustrates a plurality of braces coupling the module structure 302 to the central cylinder 150 at a plurality of interface locations 352. The top end panel 326 and the bottom end panel 330 are shown oriented generally parallel to one another and mounted on opposite ends of the central cylinder 150. However, the module structure 302 may be provided with additional panels (not shown) oriented normal to the longitudinal axis 116 and positioned at different locations along the length of the central cylinder 150. In this regard, the module structure 302 is not limited to a single top end panel 326 and a single bottom end panel 330, and may include one or more intermediate panels (not shown) for coupling the payload equipment panels 316 to the central cylinder 150.

Figure 7:
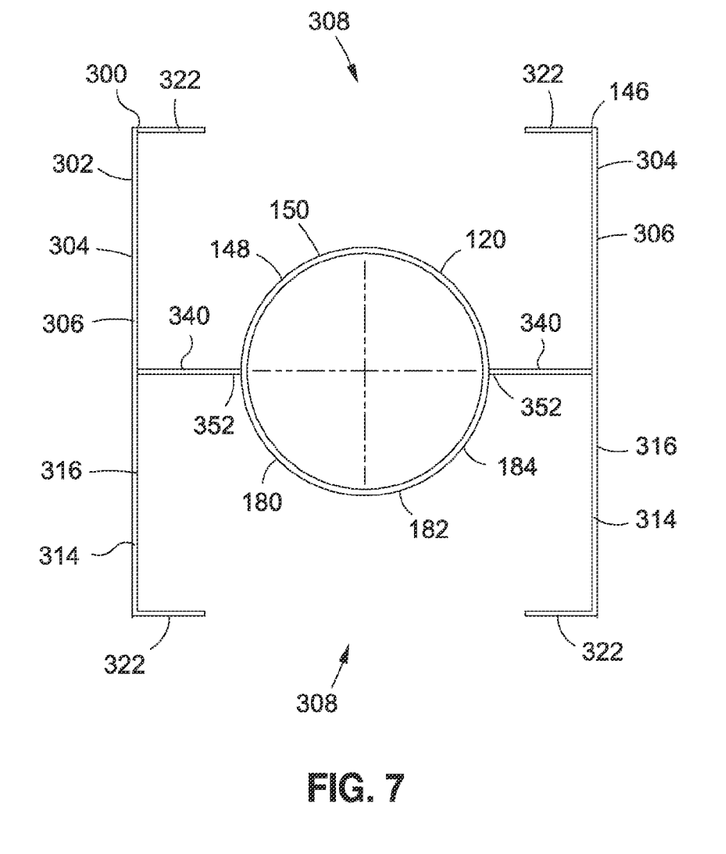
FIG. 7 is an additional side view of the module structure taken along line 7 of FIG. 6 and illustrating a plurality of braces coupling the module structure to the interface locations on the central cylinder.

FIG. 7 is a further side view of the spacecraft 146 of FIG. 6 and illustrating a pair of top panel braces 328 coupling the top end panel 326 to the cylinder top end 152. The top panel braces 328 may extend from the top end panel 326 (e.g., at the outer edges of the top end panel 326) to an interface location 352 on the sides of the central cylinder 150 at the location of a reinforcing ring (e.g., an internal ring 206). Likewise, one or more antenna braces 332 may couple the bottom end panel 330 to the cylinder bottom end 154. The antenna braces 332 may extend from the bottom end panel 330 (e.g., at the outer edges of the bottom end panel 330) to an interface location 352 on the sides of the central cylinder 150 at the location of a reinforcing ring (e.g., internal ring). The antenna brace 332 may provide support along an axial direction for the bottom end panel 330 and for the antenna mast interface 376 located on opposite sides of the bottom end panel 330.

Figure 8:
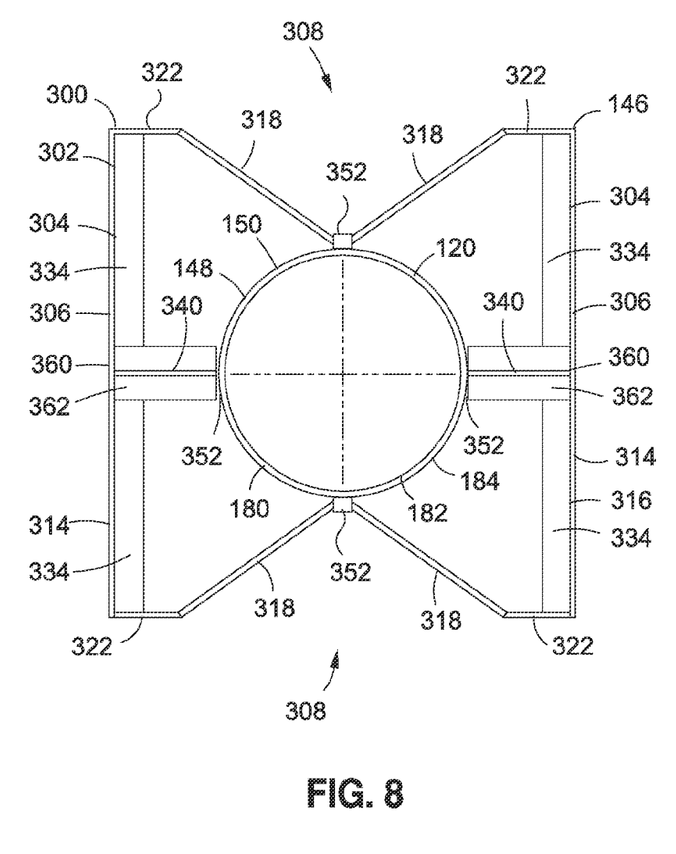
FIG. 8 is a cross-sectional illustration of the spacecraft taken along line 8 of FIG. 6 and illustrating vertical shear panels coupling the payload equipment panels to the central cylinder.

FIG. 8 is a cross-sectional view of the spacecraft 146 in an embodiment having four (4) module sides 304 including two (2) open sides 308 and two (2) closed sides 306. The closed sides 306 may be closed out by the above-described payload equipment panels 316. The open sides 308 may be devoid of rigid members as described above and which may advantageously allow for access to the components in the interior of the spacecraft 146 such as during assembly, testing, and integration. Prior to launch, the open sides 308 may be covered by a non-rigid closeout 310 (FIG. 3) such as a flexible thermal blanket 312. Also shown in FIG. 8 are the vertical shear panels 340 coupling the payload equipment panels 316 to the central cylinder 150. As indicated above, the central cylinder 150 provides the only closed cross-section 120 along the longitudinal axis 116 (FIG. 7) of the spacecraft 146 from the top of the spacecraft 146 to the interface (FIG. 1) with the launch vehicle 100 (FIG. 1) which advantageously minimizes the mass of the spacecraft 146 relative to conventional spacecraft.

Figure 9:
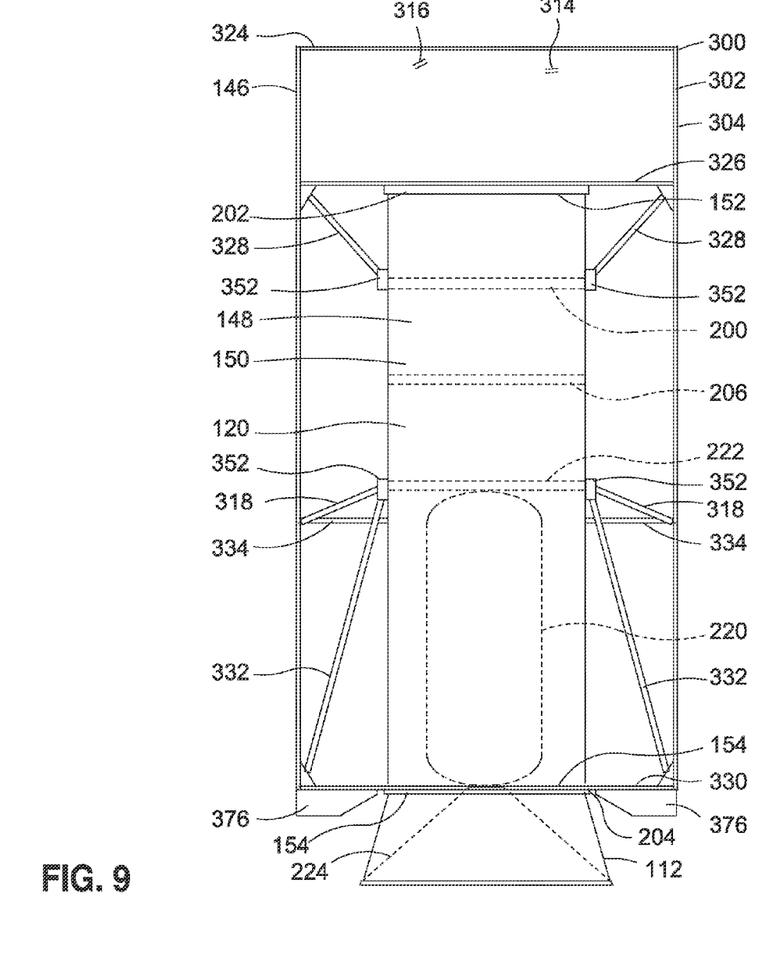
FIG. 9 is an additional cross-sectional illustration of the spacecraft taken along line 9 of FIG. 6 and illustrating payload equipment panel braces coupling the payload equipment panels to the central cylinder.

FIG. 9 is a further cross-sectional view of the spacecraft 146 illustrating the plurality of braces coupling the module structure 302 to the central cylinder 150. The payload equipment panel braces 318 may extend from interface locations 352 on the central cylinder 150 to the corner beams 322 on the vertical edges of the payload equipment panels 316 for supporting the payload equipment panels 316 against out-of-plane bending and for stabilizing the payload equipment panels 316 against twisting motion. The payload equipment panels 316 may include one or more panel inner stiffeners 334 on an inner side of each one of the payload equipment panels 316 for increasing the stiffness and rigidity of the payload equipment panels 316 at the location of the solar panel fittings 362. In this regard, the panel inner stiffeners 334 may help stabilize the solar panel fitting 362.

Figure 10:
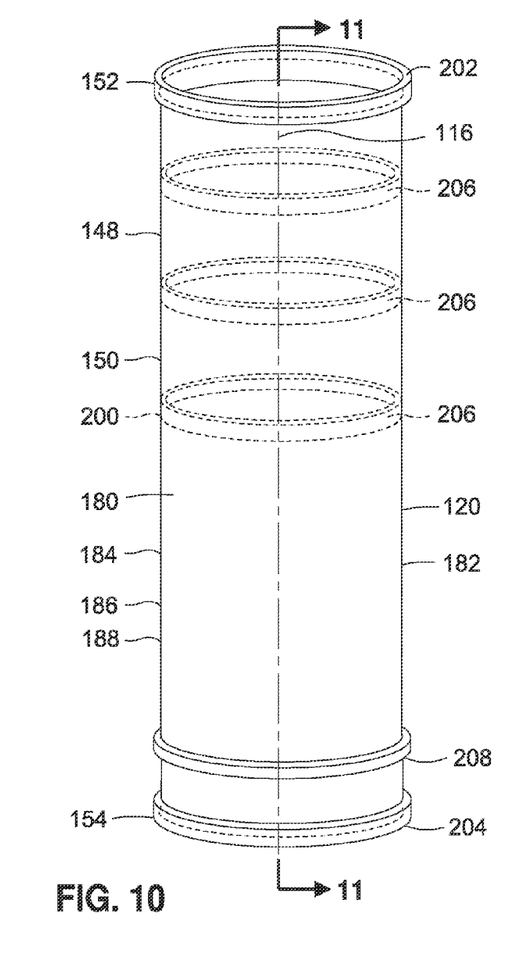
FIG. 10 is a perspective illustration of the central cylinder and illustrating a plurality of internal rings positioned at interface locations for attaching the module structure to the central cylinder.

FIG. 10 is a perspective illustration of an embodiment of the central cylinder 150. The central cylinder 150 may include a forward end ring 202 for coupling the central cylinder 150 to the top end panel 326. The central cylinder 150 may include an external ring 208 for coupling the central cylinder 150 to the bottom end panel 330. The cylinder bottom end 154 may protrude downwardly past the bottom end panel 330 and may terminate at an aft end ring 204. In an alternative embodiment shown in FIGS. 6-7 and described above, the cylinder bottom end 154 may terminate at the bottom end panel 330. The central cylinder 150 may include a plurality of reinforcing rings 200 such as internal rings 206 and/or external rings 208 that may be fixedly coupled to the central cylinder 150 by adhesive bonding and/or mechanical fastening. The reinforcing rings 200 may be positioned at one or more locations along the length of the central cylinder 150 to increase the strength of the central cylinder 150 and/or to accommodate localized loads on the central cylinder 150.

In an embodiment, the central cylinder 150 may be formed of fiber-reinforced polymer matrix material 180. For example, the central cylinder 150 may be formed as a solid laminate 182 from a plurality of laminated composite plies. The solid laminate 182 may be provided in desired thickness for carry the axial, bending, and torsional loads 104, 106, 108 (FIG. 1). The central cylinder 150 may be formed of uncured or pre-cured composite material on a mandrel. The uncured or pre-cured composite material may comprise pre-impregnated fiber-reinforced material (e.g., pre-preg) and/or resin-infused composite material polymer matrix. The composite material may include carbon fibers, glass fibers, ceramic fibers, or other fiber types which may be unidirectional, woven, chopped, or provided in other fiber arrangements. The composite material may include a polymeric matrix material or resin matrix material such as epoxy resin or other resin. The matrix material may comprise a thermosetting resin, or the resin matrix may comprise a thermoplastic resin.

In an alternative embodiment not shown, the central cylinder 150 may be formed in a composite sandwich 184 construction similar to the composite sandwich 184 construction of the rigid panels 314 and/or the vertical shear panels 340. For example, the laminated face sheets 188 may be formed of fiber-reinforced polymer matrix material 1180 similar to the reinforced polymer matrix material for the solid laminate 182 described above. In an embodiment, the laminated face sheets 188 may be formed of a plurality of laminated composite plies formed of carbon fiber composite material although the composite maternal may be formed of other types of fibers and is not limited to carbon fibers. The core layer 186 may be formed of a multi-cell material such as foam, honeycomb, or other core material having cells oriented generally perpendicular to the laminated face sheets 188. In an embodiment, the core layer 186 may comprise honeycomb core formed of aluminum, aramid, fiberglass, or other material.

Figure 11:
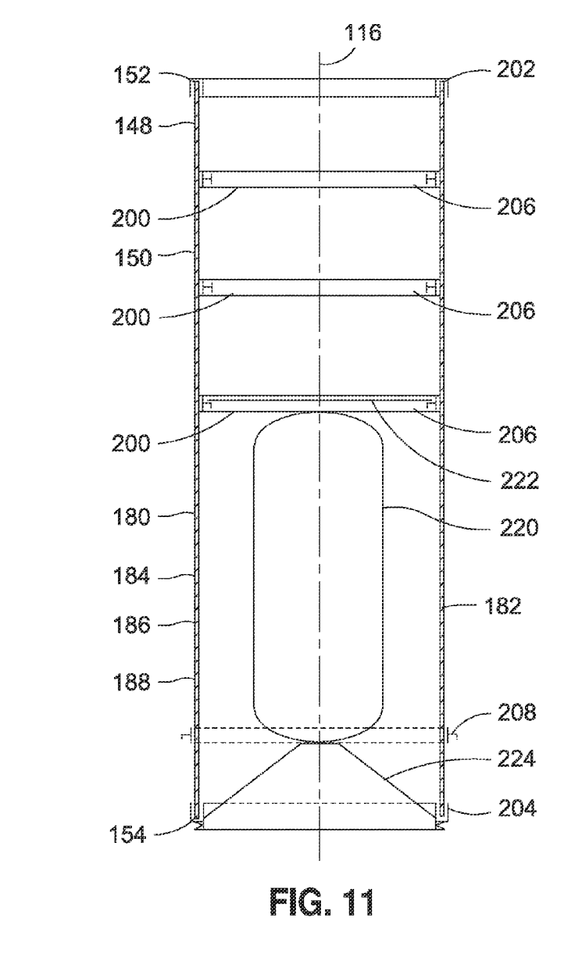
FIG. 11 is a side sectional illustration of the central cylinder taken along line 11 of FIG. 10 and illustrating the internal rings mounted to the central cylinder and a propellant tank housed within the central cylinder.

FIG. 11 is a sectional view of the central cylinder 150 of FIG. 10 and illustrating the forward end ring 202, aft end ring 204, internal rings 206, and external ring 208 mounted to the central cylinder 150. Also shown is a propellant tank 220 mounted within the central cylinder 150. Advantageously, mounting the propellant tank 220 inside the central cylinder 150 instead of outside the central cylinder 150 may free up volume that may be used for mounting spacecraft components that may require more frequent access during testing and integration. In addition, mounting the propellant tank 220 inside the central cylinder 150 instead of outside the central cylinder 150 may avoid blocking access to such spacecraft components. In an embodiment, a top end of the propellant tank 220 may be supported by a tank upper support 222 coupled to an internal ring 206. A bottom end of the propellant tank 220 may be supported by a conical tank lower support 224 which may be the coupled to an aft end ring 204 at the cylinder bottom end 1154. The propellant tank 220 may contain propellant for a propulsion system (not shown) for orbit insertion and/or station-keeping for the spacecraft 146, and/or for attitude control of the spacecraft 146.

Figure 12:
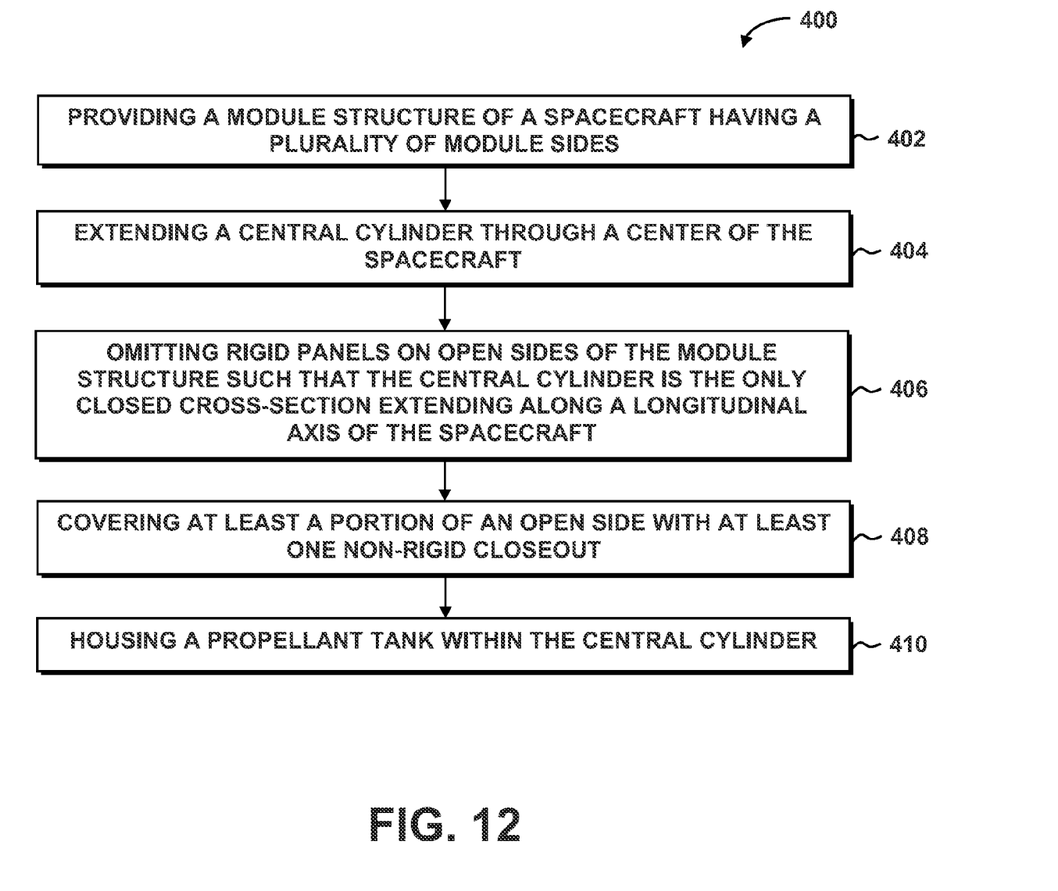
FIG. 12 is an illustration of a flow chart of a method of assembling a spacecraft.

FIG. 12 is a flow chart of a method 400 of assembling a spacecraft 146. The method may include Step 402 of providing a module structure 302 having a plurality of module sides 304. In an embodiment, the spacecraft 146 may be configured as a 3-axis-stabilized spacecraft. However, the spacecraft 146 may be configured as a spin-stabilized spacecraft. In an embodiment, the spacecraft 146 may include an electronics module 300 having open side 308 and closed sides 306. The closed sides 306 may be closed out or covered by rigid panels 314 that may be configured as payload equipment panels 316.

Step 404 of the method 400 of FIG. 12 may include extending a central cylinder 150 through a center of the spacecraft 146. The central cylinder 150 may comprise the only closed cross-section 120 extending along a longitudinal axis 116 of the spacecraft 146, and may provide a substantial portion (e.g., an entirety) of the axial, bending, and torsional strength and stiffness for the spacecraft 146. The central cylinder 150 may have a substantially constant cross-section with a substantially constant wall thickness to simplify design, analysis, manufacturing, and testing of the spacecraft 146. In an embodiment, the central cylinder 150 may be formed of fiber-reinforced polymer matrix material 180 although the central cylinder 150 may be formed of metallic material or a combination of composite material and metallic material.

Step 406 of the method 400 of FIG. 12 may include omitting rigid members from the open sides 308 of the module structure 302. The elimination of rigid members on the open sides 308 may allow for unrestricted access to the interior of the spacecraft 146 such as during assembly, testing, and integration. Access to the spacecraft 146 interior may provide a significant reduction in the time required for rework or replacement of components during testing. The closed sides 306 of the spacecraft 146 may be covered with rigid panels 314 which may be coupled to the central cylinder 150 with vertical shear panels 340 extending radially outwardly from opposite sides of the central cylinder 150. A top end panel 326 and a bottom end panel 330 may also couple the rigid panels 314 to the central cylinder 150.

Step 408 of the method 400 of FIG. 12 may include covering at least a portion of an open side 308 with at least one non-rigid closeout 310. The open sides 308 may be covered by a non-rigid closeout 310 (FIG. 3) such as a thermal blanket 312 prior to launch. The thermal blanket 312 may be removably secured to the module structure 302 such as along the corner beams 322 and along the top end panel 326 and bottom end panel 330.

Step 410 of the method 400 of FIG. 12 may include housing a propellant tank 220 within the central cylinder 150. As indicated above, the central cylinder 150 may include an internal ring 206 for coupling the tank upper support 222 to the central cylinder 150. A lower end of the propellant tank 220 may be coupled to the central cylinder 150 by means of a conical tank lower support 224. The may fixedly coupled to the aft end ring 204 of the central cylinder 150.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A spacecraft, comprising:
   a module structure of a spacecraft having a plurality of module sides;
   a central cylinder extending through a center of the spacecraft from a top end of the spacecraft to a bottom end of the spacecraft, the central cylinder being the only closed cross-section extending along a longitudinal axis of the spacecraft; and
   a pair of rigid panels coupled to opposite sides of the central cylinder and being spaced apart from one another and non-co-planar, a longitudinal axis of the rigid panels being parallel to the longitudinal axis of the spacecraft.

2. The spacecraft of claim 1, further comprising:
   a propellant tank housed within the central cylinder.

3. The spacecraft of claim 1, wherein:
   the module structure includes open sides being devoid of one or more rigid members extending across the open sides.

4. The spacecraft of claim 3, further comprising:
   at least one non-rigid closeout covering at least a portion of an open side.

5. The spacecraft of claim 4, wherein:
   the non-rigid closeout comprises a thermal blanket.

6. The spacecraft of claim 1, wherein:
   the module structure includes a vertical shear panel coupling at least one of the rigid panels to the central cylinder.

7. The spacecraft of claim 6, wherein:
   the module structure includes a top end panel and a bottom end panel mounted on opposite ends of the module structure; and
   each one of the rigid panels extending between and interconnecting the top end panel and the bottom end panel.

8. The spacecraft of claim 1, further comprising:
   at least one antenna coupled to at least one of the module sides.

9. The spacecraft of claim 1, further comprising:
   at least one solar panel coupled to at least one of the module sides.

10. The spacecraft of claim 1, further comprising:
    a generally planar thermal radiator panel included with at least one of the module sides.

11. A spacecraft, comprising:
    a module structure of a 3-axis-stabilized spacecraft having a plurality of module sides;
    a central cylinder extending through a center of the spacecraft from a top end of the spacecraft to a bottom end of the spacecraft;
    a propellant tank housed within the central cylinder, the central cylinder being the only closed cross-section extending along a longitudinal axis of the spacecraft; and
    a pair of rigid panels coupled to opposite sides of the central cylinder and being spaced apart from one another and non-co-planar, a longitudinal axis of the rigid panels being parallel to the longitudinal axis of the spacecraft.

12. A method of assembling a spacecraft, comprising the steps of:
    providing a module structure of a spacecraft having a plurality of module sides;
    extending a central cylinder through a center of the spacecraft from a top end of the spacecraft to a bottom end of the spacecraft, the central cylinder being the only closed cross-section extending along a longitudinal axis of the spacecraft; and
    coupling a pair of rigid panels to opposite sides of the central cylinder, the rigid panels being spaced apart from one another and non-co-planar, a longitudinal axis of the rigid panels being parallel to the longitudinal axis of the spacecraft.

13. The method of claim 12, further comprising the step of:
    housing a propellant tank within the central cylinder.

14. The method of claim 12, further comprising the step of:
    omitting rigid members from open sides of the module structure.

15. The method of claim 14, further comprising the step of:
    covering at least a portion of an open side with at least one non-rigid closeout.

16. The method of claim 15, wherein:
    the non-rigid closeout comprises a thermal blanket.

17. The method of claim 12, further comprising the step of:
    coupling at least one of the rigid panels to the central cylinder using a vertical shear panel.

18. The method of claim 12, further comprising the step of:
    mounting a top end panel and a bottom end panel mounted on opposite ends of the module structure; and
    interconnecting the top end panel and the bottom end panel with at least one of the rigid panels.

* * * * *